Patented Feb. 12, 1952

2,585,610

UNITED STATES PATENT OFFICE 2,585,610

PROCESS FOR DYEING FURS USING AN AQUEOUS ALCOHOL SOLUTION OF A COMPLEX METAL COMPOUND OF AN AZO DYESTUFF FREE FROM ACID GROUPS

Robert Wittwer, Basel, Switzerland, assignor to Ciba Limited, Basel, Switzerland, a Swiss firm No Drawing. Application February 25, 1949, Serial No. 78,464. In Switzerland March 11, 1948

1 Claim. (Cl. 8—10)

Animal fibers such as wool, hair and the like are normally dyed in aqueous acid dyebaths at boiling temperature. There are cases, however, where this method of treatment is not applicable for one reason or another. Thus, for example, in the dyeing of animal skins and furs the sensitivity of the skin portion to high temperatures prevents the application of the normal dyeing process. In other cases, as, for example, in the dyeing of unevenly deteriorated wool, for example, in the redyeing of worn clothing which contains wool which has been unevenly deteriorated by the action of light, it is very difficult by means of the normal processes to obtain uniform color shades, in particular, light and medium shades. In such and similar cases it is the result of experience that in order to achieve the desired result in spite of the difficulties considerable trouble will be taken, for example, doing a large part of the work by hand and/or using complicated apparatus.

According to the present invention animal fibers, in particular, furs, skins and the like can be dyed in an advantageous manner by working in dyebaths which contain a substantial proportion of organic solvents miscible with water.

As organic solvents miscible with water there come into question advantageously low molecular alcohols, in particular, ethyl alcohol, polyhydric alcohols, in particular glycol, low molecular ketones such as acetone, low molecular aliphatic esters such as ethyl acetate and mixtures of these solvents.

As dyestuffs there can be employed for the present process such as are soluble in at least one of the solvent components present in the dyebath, that is to say, in an organic solvent or in water. The dyestuffs may be members of any desired group, as for example, azo dyestuffs, triaryl methane dyestuffs, or anthraquinone dyestuffs. They may, for example, be soluble in water on account of the presence of acid groups, as is the case with the ordinary acid dyestuffs and within this group certain neutral dyeing acid dyestuffs give especially advantageous results. There may be particularly mentioned the good results which are obtained with the large number of dyestuffs which possess no outstandingly acid groups, for example, no sulfonic acid or carboxyl groups and which therefore are only very slightly soluble in water. In many cases particularly advantageous results are obtained with the application of complex metal compounds of azo dyestuffs, in particular monoazo dyestuffs which contain in both o-positions to the azo group a group promoting complex formation. A large number of such dyestuffs are known and have hitherto been particularly recommended for the dyeing of nitrocellulose and acetyl cellulose lacquers.

As examples of dyestuffs which are applicable for the present process may be mentioned:

The dyestuff from diazotized aniline and 1-(2'-chloro-5'-sulfo) - phenyl-3-methyl-5-pyrazolone, the complex chromium compound (1:1) of the dyestuff from 1-diazo-2-hydroxynaphthalene-4-sulfonic acid and 1-phenyl-3-methylpyrazolone, the dyestuff appearing under the name of Wool Fast Blue BL, Color Index No. 833, the complex chromium and cobalt compounds of the dyestuffs from diazotized 5-nitro-2-amino-1-hydroxybenzene and 2-hydroxynaphthalene or 5:8-dichloro-1-hydroxynaphthalene, the complex manganese and cobalt compounds of the dyestuffs from diazotized 4 - chloro-2-amino - 1 - hydroxybenzene and 4-nitro-2-amino-1-hydroxybenzene and 1:3-dihydroxybenzene, the dyestuffs from diazotized aniline or diazotized 2-nitro-4-methyl-1-aminobenzene and 3 - methylpyrazolone or 1-(2'-chloro)-phenyl-3-methyl pyrazolone, the complex cobalt compounds of the dyestuffs from diazotized 4-nitro-2-amino - 1 - hydroxybenzene and aceto-acetanilide or 1-phenyl-3-methylpyrazolone, the complex chromium-aluminum compounds of the dyestuff from diazotized 5 - nitro - 2 - amino - 1 - hydroxybenzene and 1-phenyl-3-methylpyrazolone, the complex chromium compound of the dyestuff from diazotized 5-nitro-2-amino-1-hydroxybenzene and 2-aminonaphthalene and also the molecular compound of Rhodamin B Extra (Schultz, Farbostofftabellen, 7th edition, No. 864) and the cobalt compound of the dyestuff from diazotized 4-nitro-2-amino-1-hydroxybenzene and 1-phenyl-3-methyl pyrazolone.

The dyeing operation can, for example, be carried out in such a manner that the material to be dyed is entered into a dyebath which consists of water and the organic solvent to be employed, for example, alcohol, and which contains the desired quantity of dyestuff. The mixture ratio of the two components can vary within relatively wide limits. There should, however, always be a minimum of about 10 per cent and preferably about 20 per cent of organic solvents miscible with water in all proportions. Valuable results are obtained with mixture ratios of 4:6 to 6:4 between water and alcohol. Obviously the solubility of the dyestuffs to be employed in the mixture to be used must be taken into consideration so that dyestuffs are only dyed from such mixtures as still exhibit a sufficient solvent capacity for the dyestuff concerned. Similar or the same mixture ratios can be employed in the case of other solvents miscible with water in all proportions, for example, in the case of acetone. In the case of solvents which are not miscible with water in all proportions particular care must be taken that the limits of the mutual miscibility are not exceeded, so that, for example, esters often have to be employed in appreciably smaller quantities, for example, from 10 per cent upwards of the bath but in spite of this they still give advantageous results. The same is also true in the case of polyhydric alcohols in spite of the, in general, good miscibility with water of these compounds.

It is often of advantage only to adjust the contemplated mixture ratio between water and organic solvents towards the end of the dyeing operation, by adding a part of the water, for example, ⅓ to ⅔ of this quantity during the dyeing itself, care still being taken, of course, that the solubility of the dyestuffs employed in the mixture existing at any moment is still sufficient. Conversely, the dyestuff itself may be added to the dyebath in portions during the dyeing. This is of advantage, for example, when dyestuffs are employed which possess only very slight solubility in water and are added to the dyebath dissolved in organic solvents.

The dyeing can be carried out at relatively low temperatures, for example, between about 20–80° C. Of particular advantage is the possibility of dyeing at such temperatures as do not damage the skin portion of furs and skins, for example, at about 40–60° C. In the dyeing obviously account must be taken of the volatility and the boiling point of the organic solvent employed.

In many cases it is advantageous to add to the dyebath at the commencement of the dyeing a certain quantity of an acid, suitably a volatile acid such as hydrochloric acid, acetic acid or particularly formic acid. The addition may, for example, amount to 5 grams per liter of dyebath.

It is a surprising fact that the present process does not in any way lead to a mere surface dyeing of the material. On the contrary it is an essential advantage of this process that frequently very uniform dyeings of good penetrating properties can be obtained. A further advantage is the circumstance that the hair portion of furs is usually noticeably stronger dyed than the skin portion and that compared with processes which work with purely aqueous treatment baths, in many cases a much lower degree of felting of the fibers takes place. By addition of agents of capillary activity, which may be anion or cation active, for example, N-benzyl-μ-heptadecyl-benzimidazole disulfonic acid salts or quaternary monoacylation products of fatty acids with ethylene diamine, in certain cases the tendency to shrinkage of the skin can be counteracted.

Obviously by suitable pretreatment of the skins, for example, by wetting them in the solvent mixture which subsequently serves as dyebath, in many cases the penetration can be still further improved.

After dyeing, by means of a suitable washing treatment, for example, with a dispersing agent the fastness to rubbing of the dyeings obtained can be still further improved.

The present process is suitable in particular for the dyeing of sheepskins which have been improved in such a manner as to render them similar to furs by suitable operations of a mechanical or chemical nature, for example, by swelling treatments, with or without treatment with formaldehyde or with synthetic resins or their precondensates. Such improved skins are known under various names such as Hudson seal, Beaver lamb, Mouton doré and so on. Processes for the improvement of skins are described, for example, in French Patents Nos. 759,162, 808,707, 827,131, and 840,277.

The following examples illustrate the invention, the parts and percentages being by weight:

*Example 1*

20 parts of a sheepskin which has been dressed by a combination tanning of alum with chromium compounds, synthetic tanning materials and the like, are, without special pre-treatment, dyed in a bath consisting of 500 parts of water, 500 parts of alcohol, 0.25 part of the complex cobalt compound of the dyestuff from diazotized 4-nitro-2-amino-1-hydroxy-benzene and 1-phenyl-3-methyl-pyrazolone together with 5 parts of 85 per cent formic acid. The goods are entered at 30° C., the temperature raised within ½ hour to 50–55° C. and dyeing effected at this temperature for a further ½ hour. Thereupon the skin is well rinsed in water, then pressed or hydroextracted, fatted and dried. The hair becomes bright orange colored. The dyeing is fast to rubbing and the skin itself is only slightly dyed.

*Example 2*

25 parts of shorn lamb skin which has been improved to render it more fur-like by treatment with synthetic resin, is dyed in a bath of the following composition:

600 parts of water, 400 parts of acetone, 0.2 part of the 1:1 chromium compound of the dyestuff from 1-diazo-2-hydroxynaphthalene-4-sulfonic acid and 1-phenyl-3-methylpyrazolone, 5 parts of 85 per cent. formic acid. The operation is continued as described in Example 1 and a bright pink colored skin is obtained. The dyeing is uniform, and fast to rubbing.

*Example 3*

20 parts of a sheep skin dressed by a combination tanning operation are entered at 30° C. into a dyebath of the following composition:

0.3 part of the dyestuff from diazotized 1-amino-2-nitro-4-methylbenzene and 3-methylpyrazolone, 0.06 part of the chromium-aluminum complex of the dyestuff from diazotized 5-nitro-2-amino-1-hydroxybenzene and 1-phenyl-3-methylpyrazolone, 0.04 part of the complex chromium compound of the dyestuff from diazotized 5-nitro-2-amino-1-hydroxybenzene and 2-hydroxynaphthalene, 500 parts of alcohol, 170 parts of water, 2 parts of 85 per cent. formic acid, 0.5 part of the sodium salt of N-benzyl-μ-heptadecylbenzimidazole disulfonic acid. The bath is heated to 50–55° C., a further 170 parts of water added, and dyeing is carried out at the stated temperature for ¼ hour whereupon a further 180 parts of water are added and dyeing finally continued for ½ hour at the same temperature. A uniform red-brown dyeing is obtained with good penetration of the hair and weaker dyeing of the skin.

*Example 4*

100 parts of wool gabardine are dyed at 50–60° C. in a dyebath which contains 3200 parts of alcohol, 800 parts of water, 1 part of the chromium complex of the dyestuff from diazotized 5-nitro-2-amino-1-hydroxybenzene and 2-hydroxynaphthalene and if desired, 4-8 parts of 85 per cent. formic acid. After dyeing for 2 hours the goods are rinsed for a short time in alcohol. A level dark grey dyeing which is fast to light and rubbing is obtained. Even if the wool gabardine which is used has been locally affected by rubbing or by the action of light a substantially level dyeing is nevertheless still obtained.

*Example 5*

100 parts of shorn lamb skin which has been subjected to a lustring treatment are pretreated for 30 minutes at 45° C. in a bath containing 2400 parts of alcohol and 1600 parts of water and to which 8 parts of 85 per cent. formic acid have been added.

The dyestuff solution is prepared in the following manner:

3 parts of the complex cobalt compound of the dyestuff from diazotized 4-nitro-2-amino-1-hydroxybenzene and 1-phenyl-3-methylpyrazolone, 2 parts of the dyestuff from diazotized 1-aminobenzene and 1-(2'-chlorophenyl)-3-methyl pyrazolone, 1.2 parts of the chromium-aluminum complex of the dyestuff from diazotized 5-nitro-2-amino-1-hydroxybenzene and 1-phenyl-3-methylpyrazolone, 0.8 part of the chromium complex of the dyestuff from diazotized 5-nitro-2-amino-1-hydroxybenzene and 2-hydroxynaphthalene are dissolved by heating in the smallest quantity of alcohol.

In order to carry out the dyeing process, which follows at 45-50° C., the alcoholic dyestuff solution is added to the pretreatment bath in 3 portions at intervals in each case of about 30 minutes. After the last addition dyeing is continued for a further 30-45 minutes. Complete exhaustion of the dyebath does not usually take place.

The dyed skin is freed from excess of dyebath by allowing to drain and pressing and washed at 40° C. in a second bath which contains per 1000 parts of water, 1 part of the sodium salt of N-benzyl-$\mu$-heptadecylbenzimidazole disulfonic acid.

A level deep brown dyeing results of very good penetration, fastness to rubbing and fastness to light.

In the appended claim the term fur is to be understood in its broader sense including e. g. those haired skins which are normally not used for coats, capes and similar garments but may be intended as carpets, for medicinal purposes etc.

Having thus described the invention what is claimed is:

A process for dyeing furs which comprises conducting the dyeing operation at a temperature of from 40° C. to 60° C. in a dyebath consisting of water, from about 20 to 80 per cent. of aliphatic alcohol containing at the most three carbon atoms, and a complex metal compound of an azo dyestuff which is free from acid groups, dissolved in said dyebath.

ROBERT WITTWER.

REFERENCES CITED

The following references are of record in the file of this patent:

UNITED STATES PATENTS

| Number | Name | Date |
| --- | --- | --- |
| 357,281 | Holliday | Feb. 8, 1887 |
| 1,060,002 | Kahn | Apr. 29, 1913 |
| 1,886,412 | Gaudit | Nov. 8, 1932 |
| 2,163,043 | Kritschevsky | June 20, 1939 |
| 2,292,433 | Croft | Aug. 11, 1942 |
| 2,374,106 | Kvalnes | Apr. 17, 1945 |

FOREIGN PATENTS

| Number | Country | Date |
| --- | --- | --- |
| 279,942 | Great Britain | Nov. 4, 1927 |